(12) United States Patent
Mason et al.

(10) Patent No.: US 12,093,727 B2
(45) Date of Patent: *Sep. 17, 2024

(54) PROCESS FLOW BUILDER CUSTOMIZATION

(71) Applicant: Salesforce, Inc., San Francisco, CA (US)

(72) Inventors: Paul Anthony Mason, Port Talbot (GB); William Charles Eidson, Palo Alto, CA (US); Samuel William Bailey, Cardiff (GB); Alex Edelstein, San Francisco, CA (US); Samantha Reynard, San Francisco, CA (US); Barkha Keni, Raleigh, NC (US); Tanveer Singh Randhawa, Vallejo, CA (US)

(73) Assignee: Salessforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/236,453

(22) Filed: Apr. 21, 2021

(65) Prior Publication Data

US 2022/0326987 A1 Oct. 13, 2022

Related U.S. Application Data

(60) Provisional application No. 63/173,970, filed on Apr. 12, 2021.

(51) Int. Cl.
*G06F 3/04842* (2022.01)
*G06F 9/451* (2018.01)
(Continued)

(52) U.S. Cl.
CPC ........ *G06F 9/4881* (2013.01); *G06F 3/04842* (2013.01); *G06F 9/451* (2018.02); *G06F 9/54* (2013.01)

(58) Field of Classification Search
CPC .... G06F 9/4881; G06F 3/04842; G06F 9/451; G06F 9/54
See application file for complete search history.

(56) References Cited

U.S. PATENT DOCUMENTS

| | | | |
|---|---|---|---|
| 6,697,821 | B2 | 2/2004 | Ziff |
| 7,657,868 | B2 | 2/2010 | Shenfield |

(Continued)

FOREIGN PATENT DOCUMENTS

| | | |
|---|---|---|
| AU | 2011345318 | 10/2017 |
| CN | 103299267 A | 9/2013 |

(Continued)

OTHER PUBLICATIONS

E. Lee and S. Neuendorffer, "Classes and subclasses in actor-oriented design," Proceedings. Second ACM and IEEE International Conference on Formal Methods and Models for Co-Design, 2004. MEMOCODE '04., 2004, pp. 161-168, doi: 10.1109/MEMCOD.2004.1459848.*

(Continued)

*Primary Examiner* — Jennifer N Welch
*Assistant Examiner* — Amy P Hoang
(74) *Attorney, Agent, or Firm* — Kwan & Olynick LLP

(57) ABSTRACT

Disclosed are some implementations of systems, apparatus, methods and computer program products for facilitating the customization of a process flow builder. A first graphical user interface (GUI) identifying one or more user selectable process flow types is provided. Responsive to a selection of a process flow type, information corresponding to the selected process flow type is obtained. The information includes one or more headers and, for at least a first header, identifies one or more elements that are user-selectable for addition to a layout representing a process flow. A second GUI is generated using the information. A user may access (Continued)

the second GUI to generate a layout representing a process flow of the process flow type.

15 Claims, 11 Drawing Sheets

(51) Int. Cl.
*G06F 9/48* (2006.01)
*G06F 9/54* (2006.01)

(56) References Cited

U.S. PATENT DOCUMENTS

| | | | |
|---|---|---|---|
| 7,937,655 | B2 | 5/2011 | Teng |
| 8,572,057 | B2 | 10/2013 | Jasik et al. |
| 8,660,881 | B2 | 2/2014 | Wood et al. |
| 8,706,715 | B2 | 4/2014 | Eidson et al. |
| 8,863,119 | B2 | 10/2014 | Wood et al. |
| 9,007,364 | B2 | 4/2015 | Bailey |
| 9,058,361 | B2 | 6/2015 | Jasik et al. |
| 9,201,939 | B2 | 12/2015 | Weissman et al. |
| 9,405,797 | B2 | 8/2016 | Eidson et al. |
| 9,569,238 | B2 | 2/2017 | Wood et al. |
| 9,652,203 | B1 | 5/2017 | Haq |
| 9,762,589 | B2 | 9/2017 | Wood et al. |
| 9,774,572 | B2 | 9/2017 | Mason et al. |
| 9,774,688 | B2 | 9/2017 | Tran et al. |
| 9,785,640 | B2 | 10/2017 | Bailey |
| 9,824,108 | B2 | 11/2017 | Taylor et al. |
| 9,946,751 | B2 | 4/2018 | Eidson et al. |
| 9,954,880 | B2 | 4/2018 | Mason |
| 10,021,089 | B2 | 7/2018 | Mortimore, Jr. et al. |
| 10,055,702 | B2 | 8/2018 | Bailey et al. |
| 10,162,851 | B2 | 12/2018 | Eidson et al. |
| 10,198,463 | B2 | 2/2019 | Eidson et al. |
| 10,212,189 | B2 | 2/2019 | Mason |
| 10,419,451 | B2 | 9/2019 | Mason |
| 10,467,050 | B1* | 11/2019 | Schmidgall ............ G06F 9/4881 |
| 10,599,454 | B2 | 3/2020 | Bailey |
| 10,678,838 | B2 | 6/2020 | Bailey |
| 10,713,251 | B2 | 7/2020 | Weissman et al. |
| 10,725,795 | B2 | 7/2020 | Lipke et al. |
| 10,740,475 | B2 | 8/2020 | Eidson et al. |
| 10,747,889 | B2 | 8/2020 | Eidson et al. |
| 10,764,277 | B2 | 9/2020 | Mortimore, Jr. et al. |
| 10,775,987 | B2 | 9/2020 | Bailey et al. |
| 10,783,259 | B2 | 9/2020 | Eidson et al. |
| 10,866,959 | B2 | 12/2020 | Palmert et al. |
| 10,956,418 | B2 | 3/2021 | Eidson et al. |
| 2004/0039990 | A1 | 2/2004 | Bakar |
| 2004/0205576 | A1 | 10/2004 | Chikirivao |
| 2006/0236254 | A1 | 10/2006 | Mateescu |
| 2009/0044185 | A1 | 2/2009 | Krivopaltsev |
| 2010/0217639 | A1 | 8/2010 | Wayne |
| 2013/0047090 | A1 | 2/2013 | Bhandarkar |
| 2013/0152021 | A1* | 6/2013 | Hatfield ............. G06Q 10/0633 715/810 |
| 2013/0152038 | A1* | 6/2013 | Lim ..................... G06Q 10/103 717/101 |
| 2014/0063027 | A1 | 3/2014 | Becker |
| 2014/0229898 | A1 | 8/2014 | Terwedo |
| 2014/0280577 | A1 | 9/2014 | Beechuk |
| 2016/0188560 | A1 | 6/2016 | Chen |
| 2016/0232491 | A1 | 8/2016 | Nalsky |
| 2017/0357628 | A1 | 12/2017 | Hurley |
| 2018/0032562 | A1 | 2/2018 | Taylor et al. |
| 2018/0129484 | A1 | 5/2018 | Kannan |
| 2018/0152451 | A1 | 5/2018 | Mason |
| 2018/0321833 | A1 | 11/2018 | Nelson |
| 2019/0079963 | A1 | 3/2019 | Eidson et al. |
| 2019/0138957 | A1 | 5/2019 | Kane |
| 2020/0004576 | A1 | 1/2020 | Bull |
| 2020/0019720 | A1 | 1/2020 | Chasman et al. |
| 2020/0019899 | A1* | 1/2020 | Gentilhomme .... G06Q 10/0633 |
| 2020/0097247 | A1 | 3/2020 | Molina |
| 2020/0137195 | A1 | 4/2020 | Lipke et al. |
| 2020/0151630 | A1 | 5/2020 | Shakhnovich |
| 2020/0201660 | A1 | 6/2020 | Bailey |
| 2020/0202273 | A1 | 6/2020 | Lehmann |
| 2020/0220985 | A1 | 7/2020 | Keery |
| 2020/0410998 | A1 | 12/2020 | Bar-On |
| 2021/0089195 | A1 | 3/2021 | Kikushima |
| 2021/0303801 | A1* | 9/2021 | Dua ........................ G06F 3/16 |

FOREIGN PATENT DOCUMENTS

| | | |
|---|---|---|
| CN | 105930428 A | 9/2016 |
| EP | 2715519 B1 | 4/2019 |
| JP | 5710782 B2 | 4/2015 |
| JP | 6448609 B2 | 1/2019 |

OTHER PUBLICATIONS

U.S. Appl. No. 63/173,970, filed Apr. 12, 2021, Mason Paul Anthony.
Office Action dated Feb. 4, 2022 for U.S. Appl. No. 17/236,476 (pp. 1-11).
Office Action dated Jun. 20, 2022 for U.S. Appl. No. 17/236,476 (pp. 1-15).
Office Action dated Oct. 5, 2022 for U.S. Appl. No. 17/236,476 (pp. 1-15).
Office Action (Final Rejection) dated Feb. 7, 2023 for U.S. Appl. No. 17/236,476 (pp. 1-16).
Office Action (Non-Final Rejection) dated May 25, 2023 for U.S. Appl. No. 17/236,476 (pp. 1-15).
Office Action (Final Rejection) dated Nov. 15, 2023 for U.S. Appl. No. 17/236,476 (pp. 1-15).
Office Action (Non-Final Rejection) dated Mar. 8, 2024 for U.S. Appl. No. 17/236,476 (pp. 1-21).

* cited by examiner

300

Elements    Manager

∨ Interaction (4)

Screen

Action

Subflow

Post to Chatter

∨ Logic (3)

Assignment

Decision

Loop

∨ Data (4)

Create Records

Update Records

Get Records

Delete Records

350

Toolbox ×

Elements

Message

Wait By Duration

Decision Split

← 400

```
public PaletteBuilder hook_definePalette() {
    PaletteHeader firstHeader = new PaletteHeader("flowInteractionComponentsLabel");
    firstHeader.addPaletteElement(ElementType.SCREEN);
    firstHeader.addPaletteElement(ElementType.ACTIONCALL);
    firstHeader.addPaletteElement(ElementType.SUBFLOW);
    firstHeader.addPaletteAction(InvocableActionType.POSTTOCHATTER)

PaletteHeader secondHeader = new PaletteHeader("flowControlLogicLabel");
    secondHeader.addPaletteElement(ElementType.ASSIGNMENT);
    secondHeader.addPaletteElement(ElementType.DECISION);
    secondHeader.addPaletteElement(ElementType.WAIT);
    secondHeader.addPaletteElement(ElementType.LOOP);
    secondHeader.addPaletteElement(ElementSubType.NBALOOP);

PaletteHeader thirdHeader = new PaletteHeader("flowControlDataOperationsLabel");
    thirdHeader.addPaletteElement(ElementType.RECORDCREATE);
    thirdHeader.addPaletteElement(ElementType.RECORDUPDATE);
    thirdHeader.addPaletteElement(ElementType.RECORDQUERY);
    thirdHeader.addPaletteElement(ElementType.RECORDDELETE);

PaletteBuilder palette = new PaletteBuilder(this);
    palette.addHeader(firstHeader);
    palette.addHeader(secondHeader);
    palette.addHeader(thirdHeader);
    return palette;
}
```

*Figure 4A*

```
{headers=[
   {headerLabel=Interaction,
       headerItems=[{name=NBAExample, type=elementSubtype},
           {name=ActionCall, type=element},
           {name=Subflow, type=element}]},
   {headerLabel=Logic,
       headerItems=[{name=Assignment, type=element},
           {name=Decision, type=element},
           {name=Loop, type=element}]},
           {name=NBALoop, type=elementSubtype}]},
   {headerLabel=Data,
       headerItems=[{...
```

```
<FlowElementSubType>
   <FlowElementType>Decision</FlowElementType>//support a limited set of elements initially
   <Name>JourneyDecisionSplit</Name>
   <Label>Decision Split</Label>
   <Description>Branch based on the status field of a Case</Description>
   <icon>decision</icon>
   <color>#ff8000</color>
   <FlowBuilderConfigComponent>journey-decision-split</FlowBuilderConfigComponent>
</FlowElementSubType>
```

*Figure 4C*

PROCESS FLOW BUILDER CUSTOMIZATION

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to systems and techniques associated with generation of layouts representing process flows, and more specifically to customization of a flow builder configured to facilitate generation of layouts.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Existing design tools offer users the ability to design a layout representing a process flow using drag-and-drop operations. These tools enable a user to manually manipulate elements and associated connectors via a drag and drop process. Typically, these tools provide a pre-defined list of elements that can be selected for insertion into a layout.

BRIEF DESCRIPTION OF THE DRAWINGS

The included drawings are for illustrative purposes and serve only to provide examples of possible structures and operations for the disclosed inventive systems, apparatus, methods and computer program products for facilitating the customization of a flow builder. These drawings in no way limit any changes in form and detail that may be made by one skilled in the art without departing from the spirit and scope of the disclosed implementations.

FIG. 4A shows an example of computer-readable code 400 configured to define an interface presenting a set of user-selectable options for presentation by a flow builder, in accordance with some implementations.

FIG. 4B shows an example of computer-readable code 450 configured to facilitate flow builder customization, in accordance with some implementations.

FIG. 4C shows an example of computer-readable code 470 configured to facilitate the customization of a flow builder, in accordance with some implementations.

DETAILED DESCRIPTION

Figure 1:
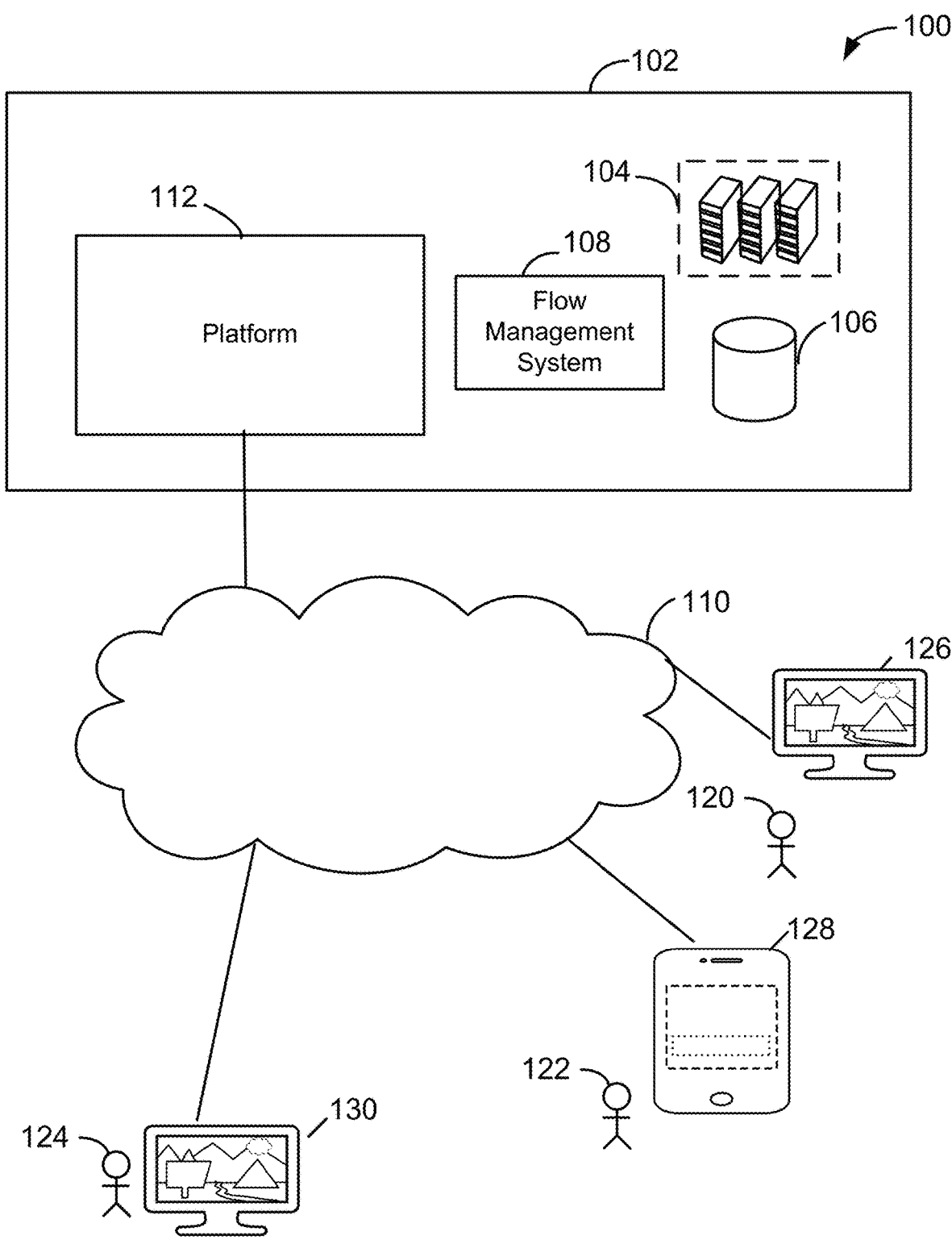
FIG. 1 shows a diagram of an example of a system 100 in which a flow management system is implemented, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from the spirit and scope of the disclosure.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more examples may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Any of the disclosed implementations may be used alone or together with one another in any combination. The one or more implementations encompassed within this specification may also include examples that are only partially mentioned or alluded to or are not mentioned or alluded to at all in this brief summary or in the abstract. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

Some implementations of the disclosed systems, apparatus, methods and computer program products are configured to facilitate the generation of layouts corresponding to process flows. In some implementations, a database system implemented using a server system facilitates customization of a flow builder that enables the generation of layouts representing process flows.

A process flow may be designed through the generation of a layout that visually represents the process flow. Elements represented in the layout may each correspond to a corresponding set of computer-readable instructions. The elements represented within the layout may be "connected" to one another within the layout through the use of connectors.

To design a layout representing a process flow, a user typically accesses a layout design tool. Generally, the design tool presents a set of user-selectable options that enable corresponding elements to be selected by a user for addition to a layout. Upon selection, the user can drag and drag-and-drop selected elements to the desired positions in the layout. However, there are a number of drawbacks associated with conventional layout design tools.

The set of elements presented by a layout design tool is generally statically configured for presentation to users that access the design tool. In other words, the set of elements is typically presented to all users accessing the layout design tool regardless of the type of process flow being generated or users' positions within their organization. As a result, the number of elements that are presented via a layout design tool can be voluminous. Since a user must navigate among numerous user-selectable options, the layout design process can be a frustrating and confusing one.

Furthermore, the set of elements for which options are presented by a design tool is typically generic. For example, one element that is commonly used within layouts is the decision element. While it may be desirable to implement a decision element that provides for more complex logic such as multiple decision branches, currently available layout design tools do not provide access to a more advanced or customized feature set.

To customize an element such as an action element, a user must typically proceed with completing a number of steps. First, the user selects a generic action element and drags-and-drops the selected element to the desired position within a layout. Second, the user clicks on the instance of the element within the layout. The user may then proceed with configuring the instance of the element so that it is customized according to the user's preferences. Typically, the user must access one or more user interfaces to submit values that customize the instance of the element. Therefore, the generation of layout that includes customized elements can be a time-consuming and cumbersome process.

In accordance with various implementations, a flow builder provides a graphical user interface (GUI) identifying a plurality of process flow types that are user-selectable. Upon selection by a user of a process flow type, the flow builder queries the system to ascertain the elements that are user-selectable for the process flow type. The flow builder may then provide a user interface (e.g., palette) that includes user-selectable options corresponding to elements that can be added to a layout of the selected process flow type. Since the interface may be customized on a per process flow type basis, the interface may exclude elements that are irrelevant to the process flow type. Therefore, a user need not navigate among options that are immaterial to the process flow being designed by the user.

In some implementations, a user interface may be customized for a process flow type such that it identifies elements that are relevant to the process flow type in a manner that is clear and understandable. The "shape" or structure of the palette for a particular process flow type may be customized such that the elements are organized according to a corresponding set of headers and/or sub-headers that are pertinent to the process flow type, facilitating the design process.

In some implementations, a user interface that provides user-selectable options corresponding to the available element types is generated, in real-time, using information obtained responsive to a flow builder query identifying the selected process flow type. The information may indicate, for example, a categorization of the element types among one or more category headers, an order in which element types are to be presented within their respective categories, and element information corresponding to each of the available element types. The element information can include display information (e.g., icon, color, label, description) that enable an element to be represented within the interface. In some implementations, the element information can include runtime information that supports the execution of a process flow corresponding to a layout that includes the element.

In some implementations, a user interface may include invocable actions. An invocable action type may correspond to a set of computer-readable instructions configured to execute an invocable action. For example, an invocable action type may include a "Post to Chatter" invocable action type, which causes a message to be posted to a social networking platform. Typically, to include an element representing an invocable action in a layout, a user must select an element of an action type from the palette. To customize the element, the user must then click on the element to further customize values of the element. By enabling an element of a specific invocable action type to be selected directly from the interface, it is possible to streamline the layout design process by simplifying or eliminating the value customization process.

In some implementations, a user interface may be customized to include elements corresponding to element subtypes. Each element subtype may be associated with a corresponding element type. For example a "Decision split" subtype may be associated with the element type "Decision." An element subtype may be defined by a subclass of a class corresponding to the parent element type, enabling an object corresponding to the element subtype to be generated by instantiating the subclass. An element of the element subtype may be implemented by overriding one or more default values of the parent class, which may be applied during execution of a process flow. By enabling elements of element subtypes to be selected directly from the user interface, this expedites the design of a layout representing a process flow.

In accordance with various implementations, a set of computer-readable instructions that defines a user interface corresponding to a particular process flow type may be generated or otherwise obtained by a flow builder. The set of computer-readable instructions may be validated to verify that the set of computer-readable instructions will generate a user interface during runtime without generating an error. Validation may include ensuring that the set of computer-readable instructions satisfy a set of interface customization rules. The interface customization rules may be applied to ensure that the structure of a user interface definition conforms to a pre-defined or valid interface definition format. For example, validation may include verifying that values are configured for all fields of a user interface (e.g., palette) or of an element definition. As another example, validation may include performing de-duplication to ensure that two instances of the same field are not present in the user interface or element definition. As another example, validation may include verifying that one or more of the values are of the correct data type. Validation may be performed at the time of generation of the set of computer-readable instructions or during runtime upon retrieval or processing of the set of computer-readable instructions.

In some implementations, a set of computer-readable instructions defining an element type or subtype is generated or obtained. Validation of the set of computer-readable instructions may similarly be performed to ensure that a definition corresponding to an element type (e.g., invocable action type) or subtype is valid. More particularly, validation may include ensuring that the definition satisfies a set of element customization rules. The element customization rules may be applied to ensure that the structure of an element type or subtype definition conforms to a pre-defined or valid format. For example, validation may include verifying that values are configured for all fields of an element type or subtype definition. As another example, validation may include verifying that value(s) are of the correct type (e.g., corresponding to the field(s)). As another example, validation may include performing de-duplication to ensure that two instances of the same field are not present in the same element type or subtype definition. As yet another example, validation may include verifying that custom element types and/or subtypes are identified, within the system, as process flow elements that can be added to a layout representing a process flow. Validation may be performed at the time of generation of the set of computer-readable instructions or during runtime upon retrieval or processing of the set of computer-readable instructions.

The examples described herein refer to a single client device to simplify the description. How-ever, it is important to note that the disclosed implementations may be implemented in a collaborative system that enables a layout to be accessed or updated via multiple client devices. Therefore, a layout may be generated and/or updated responsive to requests received from more than one client device.

FIG. 1 shows a diagram of an example of a system 100 in which a flow management system is implemented, in accordance with some implementations. Database system 102 includes a variety of different hardware and/or software components that are in communication with each other. In the non-limiting example of FIG. 1, system 102 includes any number of computing devices such as servers 104. Servers 104 are in communication with one or more storage mediums 106 configured to store and maintain relevant data and/or metadata used to perform some of the techniques disclosed herein, as well as to store and maintain relevant data and/or metadata generated by the techniques disclosed herein. Storage mediums 106 may further store computer-readable instructions configured to perform some of the techniques described herein. Storage mediums 106 can also store user profiles, layouts, and/or database records such as customer relationship management (CRM) records.

System 102 includes flow management system 108 that facilitates the generation and updating of layouts, as described herein. As will be described in further detail below, flow management system 108 is configured to facilitate the customization of a layout design tool. In the following description, a layout design tool will be referred to as a "flow builder."

In some implementations, system 102 is configured to store user profiles/user accounts associated with users of system 102. Information maintained in a user profile of a user can include a client identifier such an Internet Protocol (IP) address or Media Access Control (MAC) address. In addition, the information can include a unique user identifier such as an alpha-numerical identifier, the user's name, a user email address, and credentials of the user. Credentials of the user can include a username and password. The information can further include job related information such as a job title, role, group, department, organization, and/or experience level, as well as any associated permissions. Job related information and any associated permissions can be applied by flow management system 108 to manage access to layouts.

In some implementations, information in a user profile may be used to determine the process flow types that are user-selectable by a user. For example, a Sales group within an organization may have access to a corresponding set of process flow types, which may pertain to sales process flows. As another example, a Marketing group within the organization may have access to a corresponding set of process flow types. Therefore, different groups within an organization may correspond to different sets of process flow types.

Client devices 126, 128, 130 may be in communication with system 102 via network 110. More particularly, client devices 126, 128, 130 may communicate with servers 104 via network 110. For example, network 110 can be the Internet. In another example, network 110 comprises one or more local area networks (LAN) in communication with one or more wide area networks (WAN) such as the Internet.

Embodiments described herein are often implemented in a cloud computing environment, in which network 110, servers 104, and possible additional apparatus and systems such as multi-tenant databases may all be considered part of the "cloud." Servers 104 may be associated with a network domain, such as www.salesforce.com and may be controlled by a data provider associated with the network domain. In this example, employee users 120, 122, 124 of client computing devices 126, 128, 130 have accounts at Salesforce.com®. By logging into their accounts, users 126, 128, 130 can access the various services and data provided by system 102 to employees. In other implementations, users 120, 122, 124 need not be employees of Salesforce.com® or log into accounts to access services and data provided by system 102. Examples of devices used by users include, but are not limited to a desktop computer or portable electronic device such as a smartphone, a tablet, a laptop, a wearable device such as Google Glass®, another optical head-mounted display (OHMD) device, a smart watch, etc.

In some implementations, users 120, 122, 124 of client devices 126, 128, 130 can access services provided by system 102 via platform 112 or an application installed on client devices 126, 128, 130. More particularly, client devices 126, 128, 130 can log into system 102 via an application programming interface (API) or via a graphical user interface (GUI) using credentials of corresponding users 120, 122, 124 respectively.

In some instances, a user may be a software developer, manager, system administrator, or other individual that generates computer-readable instructions configured to customize a flow builder, as will be described in further detail below. In other instances, a user may access the flow builder to design a layout representing a process flow.

Client devices 126, 128, 130 can communicate with system 102 to customize a flow builder and/or access a flow builder to generate or update a layout. Communications between client devices 126, 128, 130 and system 102 can be initiated by a user 120, 122, 124. Alternatively, communications can be initiated by system 102 and/or application(s) installed on client devices 126, 128, 130. Therefore, communications between client devices 126, 128, 130 and system 102 can be initiated automatically or responsive to a user request.

Some implementations may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some implementations may also be practiced in distributed computing environments where tasks are performed by remote processing devices that are linked through a communications network. In a distributed computing environment, program modules may be located in both local and remote computer storage media including memory storage devices.

Figure 2:
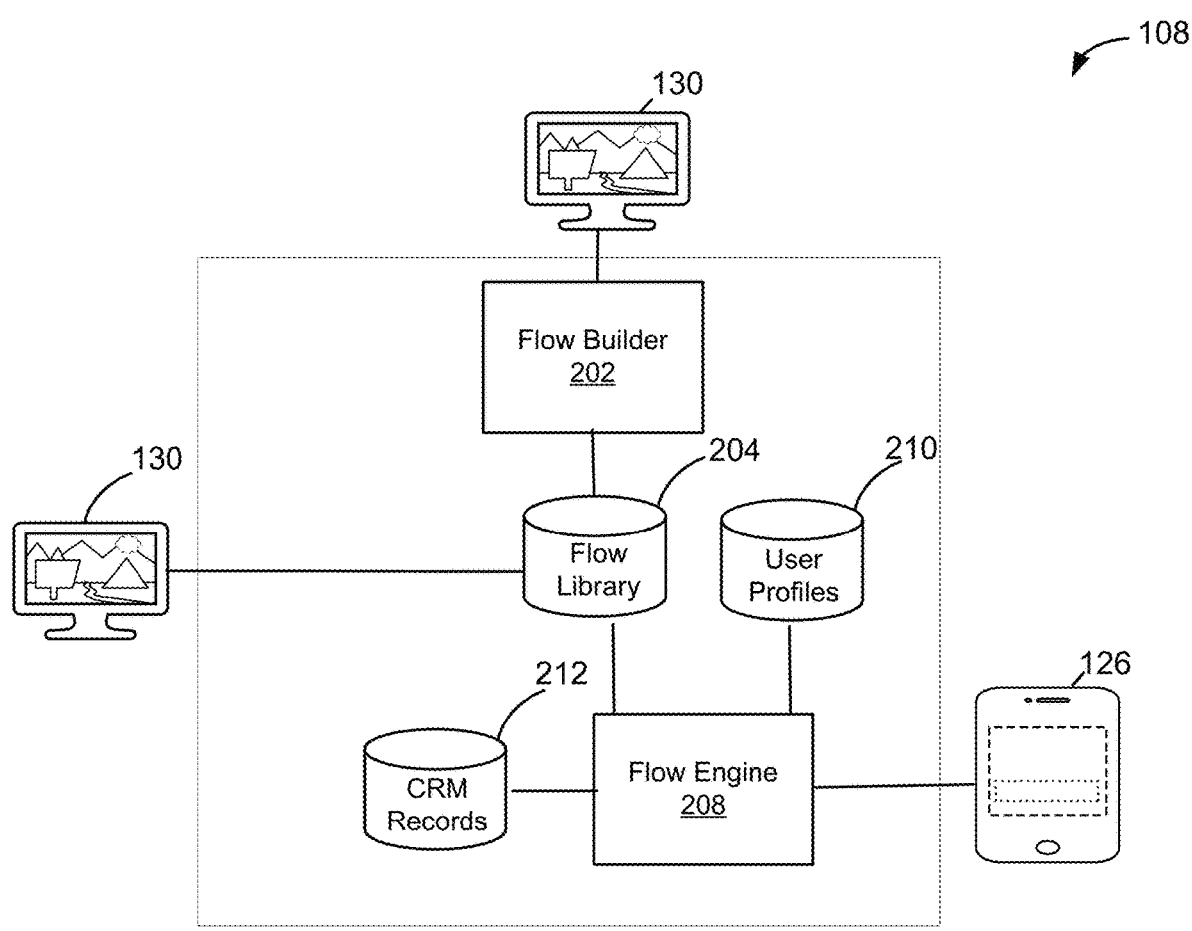
FIG. 2 shows a system diagram of an example of a flow management system 108, in accordance with some implementations

FIG. 2 shows a system diagram of an example of a flow management system 108, in accordance with some implementations. Flow management system 108 can include a flow builder 202 that enables a flow to be generated using existing flows and/or other components. For example, an administrator, software developer, or other user may access flow builder 202 via computing device 130 to generate a layout representing a flow including a plurality of elements.

In some implementations, the user may select a process flow type from a plurality of process flow types. Upon transmission of a request for palette information corresponding to the selected process flow type, a validation process may be performed by the system, as will be described in further detail below. The flow builder generates or obtains a palette corresponding to the selected process flow type and provides the palette for presentation via client device 130. Element(s) within the palette may correspond to invocable action type(s) and/or element subtype(s), which may be defined as described herein.

The user may select element(s) from the palette and perform drag-and-drop operations to position the elements within a layout. Flow builder 202 can generate a visual representation that represents the flow in the form of a plurality of interconnected nodes that correspond to the elements of the flow. The visual representation of the flow may be provided for display via computing device 130, enabling the layout to be easily modified using drag-and-drop operations. As a user interacts with flow builder 202, a layout may be updated in real-time and provided for display via a computing device 126, enabling the flow to be easily modified using click-based or drag-and-drop operations.

Once generated, a flow may be stored in flow library 204. Each flow may be identified by a corresponding flow identifier. A flow may be stored in the form of a file that includes a set of computer-readable instructions.

In some implementations, an element of a particular type (e.g., element, sub-element, or invocable action) may be associated with a corresponding a set of computer-readable instructions that is executed during execution of a flow including the element. For example, an element may have an associated application programming interface (API) that is called during execution of the flow.

In some implementations, flow builder customization is facilitated through an object-oriented system. Each element may correspond to an object that is generated via instantiating a class (or subclass), which may correspond to the type of element or its parent (or base) type.

Flow engine 208 may manage execution of flows. More particularly, a user may request execution of a flow via computing device 126 or, alternatively, another individual can request execution of the flow on behalf of the user. Flow engine 208 can access a profile of the user from user profiles 210 to determine whether the user is authorized to execute the flow. Upon determining that the user is authorized to execute the flow, flow engine 208 executes the flow.

During execution of the flow, flow engine 208 may execute computer-readable instructions corresponding to elements of the flow. In some instances, the order in which elements of the flow are traversed is determined, at least in part, on user selections during execution of the flow.

Database records such as CRM records 212 may be accessed during execution of a flow. Access of a database record can include the performance of a create, update, read, or delete database operation on the database record. Access of a database record may result in the updating of the database record or an independent log file.

During execution of the flow, the flow can provide data for presentation via a client device 126 and/or receive data submitted via client device 126. For example, data can be submitted and/or presented via client device 126 in relation to a screen element of the flow. In addition, data generated by the flow can be provided for presentation via client device 126 upon completion of execution of the flow.

Flow builder 202 may be implemented in a variety of contexts. For example, flow builder 202 may be accessed by a software designer or engineer tasked with designing a software program or system. As another example, flow builder 202 may be accessed by an administrator or other individual to design a learning course via an online e-Learning system.

Figure 3A:
FIG. 3A shows a diagram of an example of a graphical user interface (GUI) 300 that may be presented by a flow builder, in accordance with some implementations
Figure 3A:
Figure 3A:
Figure 3A:
Figure 3A:
Figure 3A:
Figure 3A:
Figure 3A:
Figure 3A:
Figure 3A:
Figure 3A:
Figure 3A:

FIG. 3A shows a diagram of an example of a graphical user interface (GUI) 300 that may be presented by a flow builder, in accordance with some implementations. In this example, GUI 300 represents a palette that is presented by a flow builder in association with a selected process flow type. More particularly, GUI 300 presents elements that are user-selectable for addition to a layout.

In some implementations, the palette is customizable via generation of computer-readable instructions that define a palette definition. The palette definition may define a "shape" of the palette. In other words, the computer-readable instructions may define a structure of GUI 300. The computer-readable instructions may define the structure of the palette through the use of one or more headers. In addition, a header may have one or more sub-headers associated therewith. Specifically, a palette definition may be generated that identifies one or more headers and, for each of the headers, an ordered list of one or more elements indicating an order in which the elements are to be presented in association with the header within the palette. The palette definition may similarly indicate, for any subheader, an ordered list of elements that are to be presented in association with the subheader. Therefore, each header or subheader may be associated with an ordered list of elements.

In some implementations, the palette definition conforms to a palette definition format. An example palette definition will be described in further detail below.

In some implementations, the palette is configurable to include an element of an invocable action type. An invocable action type may correspond to a particular set of computer-readable instructions configurable to invoke a corresponding invocable action. Example invocable actions include, but are not limited to, Post to Chatter, Email Alert, Quick Action, Recalculate Forecast, Copy Document, and Add Users to Chat. Thus, an invocable action may interface with a variety of systems such as a social networking system, email or other messaging system, or document management system.

In this example, GUI 300 includes three headers: Interaction, Logic, and Data. Each header is associated with a list of elements. For the Interaction header, the elements include a Screen element, an Action element, a Subflow element, and a Post to Chatter element; for the Logic header, the elements include an Assignment element, a Decision element, and a Loop element, for the Data header, the elements include a Create Records element, an Update Records element, a Get Records element, and a Delete Records element.

Each element may be represented in the palette through application of a corresponding element definition. An element definition may identify, for example, an icon that is to be used to represent the element within the palette and layout, a color that is used to display the icon, a label that is rendered in conjunction with the icon, and/or a description that is rendered upon hovering over the element within the palette. In addition, an element definition may include runtime information such as an API that is t used to call a set of computer-readable instructions (e.g., procedure or function) associated with the element during execution of a process flow represented by a layout including the element. The element definition may also include one or more parameter values of parameter(s) of the API.

Figure 3B:
FIG. 3B shows a diagram of another example of a GUI 350 that may be presented by a flow builder, in accordance with some implementations.
Figure 3B:
Figure 3B:

In some implementations, a palette may be customized to identify elements corresponding to element subtypes. FIG. 3B shows a diagram of another example of a GUI 350 that may be presented by a flow builder, in accordance with some implementations. In this example, the elements include a Message element, a Wait By Duration element, and a Decision Split element. In some implementations, the Wait By Duration element and Decision Split element are instances of element subtypes associated with the Decision element type. An element subtype may be presented within a palette instead of or in conjunction with the corresponding element type.

An element subtype may be represented in the palette using a corresponding element definition, as described herein. In addition, runtime information such as parameter values associated with an element subtype may be configured via an element definition. For example, a parameter value such as a duration associated with a Wait By Duration element may be customized via an element definition.

A user may perform a drag-and-drop operation to add an instance of an element to a layout. Once the element is positioned within the layout, the user may click on the element to further customize the element. More particularly, the user may customize parameter values of the element, enabling the parameter values to be provided via an API associated with the element during runtime. Computer-readable instructions associated with the element may execute according to the parameter values.

For example, in response to adding an instance of a Message element to a layout, the user may click on the added Message element to customize the email addresses(s) to which a message is sent. As another example, in response to adding an instance of a Wait By Duration element, the user may click on the added Wait By Duration element to customize the duration associated with the element.

A palette may present a plurality of items (e.g., elements), which may be grouped in association with one or more headers. To generate a palette definition, a software developer, manager, or other user may generate computer-readable instructions that define a palette. In addition, the developer may associate the palette definition with a particular process flow type. The palette definition is stored in association with the process flow type, enabling the palette definition to be retrieved during runtime. For example, palette definitions may be indexed according to process flow type identifiers.

FIG. 4A shows an example of computer-readable code 400 configured to define a palette for presentation by a flow builder, in accordance with some implementations. In this example, the palette definition is a hook that augments the behavior of the flow builder. More particularly, the hook may be associated with a particular process flow type, enabling the hook to be called when a user selects the process flow type.

The palette definition may include a list of one or more headers, where each header is identified by a header label. The order of the headers in the list may correspond to the order in which the headers are presented within a palette. Each header may be identified by a value of a corresponding field or parameter value of the palette definition.

Each header may be associated with a list of one or more items. Each item may be identified by a name and a corresponding type. Example types include, but are not limited to an element, an element subtype, or an invocable action. The order of the items in the list may correspond to the order in which the items are presented adjacent to and/or beneath the corresponding header. The name and/or type of an item may be identified in one or more corresponding fields or parameter values of the palette definition. In some implementations, a type (e.g., element type, invocable action type, or element subtype) is defined via a corresponding class or subclass.

In this example, the palette includes three headers. The palette definition defines, for each of the headers, a corresponding set of items and an order in which the items are to be presented in association with (e.g., below) the header. For each item, a corresponding name and type is specified.

As shown in FIG. 4A, the first header has associated therewith four items: SCREEN, ACTIONCALL, SUBFLOW, AND POSTTOCHATTER. The SCREEN item is identified as an element type, the ACTIONCALL item is identified as an element type, the SUBFLOW item is identified as an element type, and the POSTTOCHATTER item is identified as an invocable action type. The second header has associated therewith five items: ASSIGNMENT, DECISION, WAIT, LOOP, AND NBALOOP. The ASSIGNMENT item is identified as an element type, the DECISION item is identified as an element type, the WAIT item is identified as an element type, the LOOP item is identified as an element type, and the NBALOOP item is identified as an element subtype. The third header has associated therewith four items: RECORDCREATE, RECORDUPDATE, RECORDQUERY, and RECORDDELETE. Each of the items of the third header is identified as an element type.

When a user selects a process flow type, the flow builder may transmit a query to a system module to obtain palette information for the process flow type. The flow builder may then generate a palette using the palette information. In some implementations, the palette information includes computer-readable instructions that can be used by the flow builder to generate a palette. For example, the palette information can include or be described using JSON formatted data. Example JSON formatted data will be described in further detail below with reference to FIGS. 4B and 4C.

FIG. 4B shows an example of computer-readable code 450 configured to enable a flow builder to present a user interface including a set of user-selectable options, in accordance with some implementations. In this example, the computer-readable code 450 includes JSON formatted data that identifies headers of the palette and identifies, for each header, associated items in the order in which they are to be presented within the palette. For each item, the computer-readable code 450 may include a name and type. A palette may include items of one or more types. Example types include an element type, an element subtype, and an invocable action type.

Computer-readable code 450 may be generated, in real-time, by the flow builder or in response to a query received from the flow builder. Alternatively, computer-readable code 450 may be obtained from a repository of palette information associated with various palette definitions.

The palette information may also include, for each item in the palette, associated item information. More particularly, the palette information may include item information associated with each item (e.g., element, element subtype, and/or invocable action). An example of item information associated with an element subtype will be described in further detail below with reference to FIG. 4C.

FIG. 4C shows an example of computer-readable code 470 configured to enable a flow builder to present a user-selectable option corresponding an element subtype, in accordance with some implementations. In this example, the computer-readable code 450 includes JSON formatted data that includes item information associated with an item of a palette. As shown in FIG. 4C, the item information can include a name of an element type of which the item is an element subtype and a identifier/name of the element subtype. In this example, the element type is Decision and the name of the element subtype is JourneyDecisionSplit. The item information can further include a label that is to be displayed within the palette, a description associated with the element, an icon name associated with an icon, and/or a color. More particularly, the description may be displayed when a user hovers over an icon representing the element within the palette or layout. The icon name may identify an icon that is to be rendered within the palette in association with the label. The icon may also be positioned at a location within the layout at which the corresponding element has been positioned. The icon may be rendered in the color identified within the item information.

The item information associated with an element subtype may include one or more value(s) that override default values of the corresponding element type. For example, during execution of a process flow including an element of the element subtype JourneyDecisionSplit, a corresponding API may be called.

Computer-readable code 470 may be generated, in real-time, by the flow builder or in response to a query received from the flow builder. Alternatively, computer-readable code 450 may be obtained from a repository of item information associated with various items.

The system may validate a palette definition, palette information, and/or item information. Validation may include, for example, validating that the definition or information conforms to a valid format and/or validating the presence of a value for each item (e.g., field or parameter) of the definition or information. In some implementations, validation may include validating that the type of the value matches the type of the corresponding field.

In some implementations, a developer may flag an item (e.g., a particular element, element subtype, or action), within a database, as a corresponding layout element that can be added to a layout. This enables the item to be added to a palette and, subsequently, to a layout. By maintaining a list of layout elements, it is possible to verify that items in a palette definition are valid layout elements during a validation process.

Figure 5:
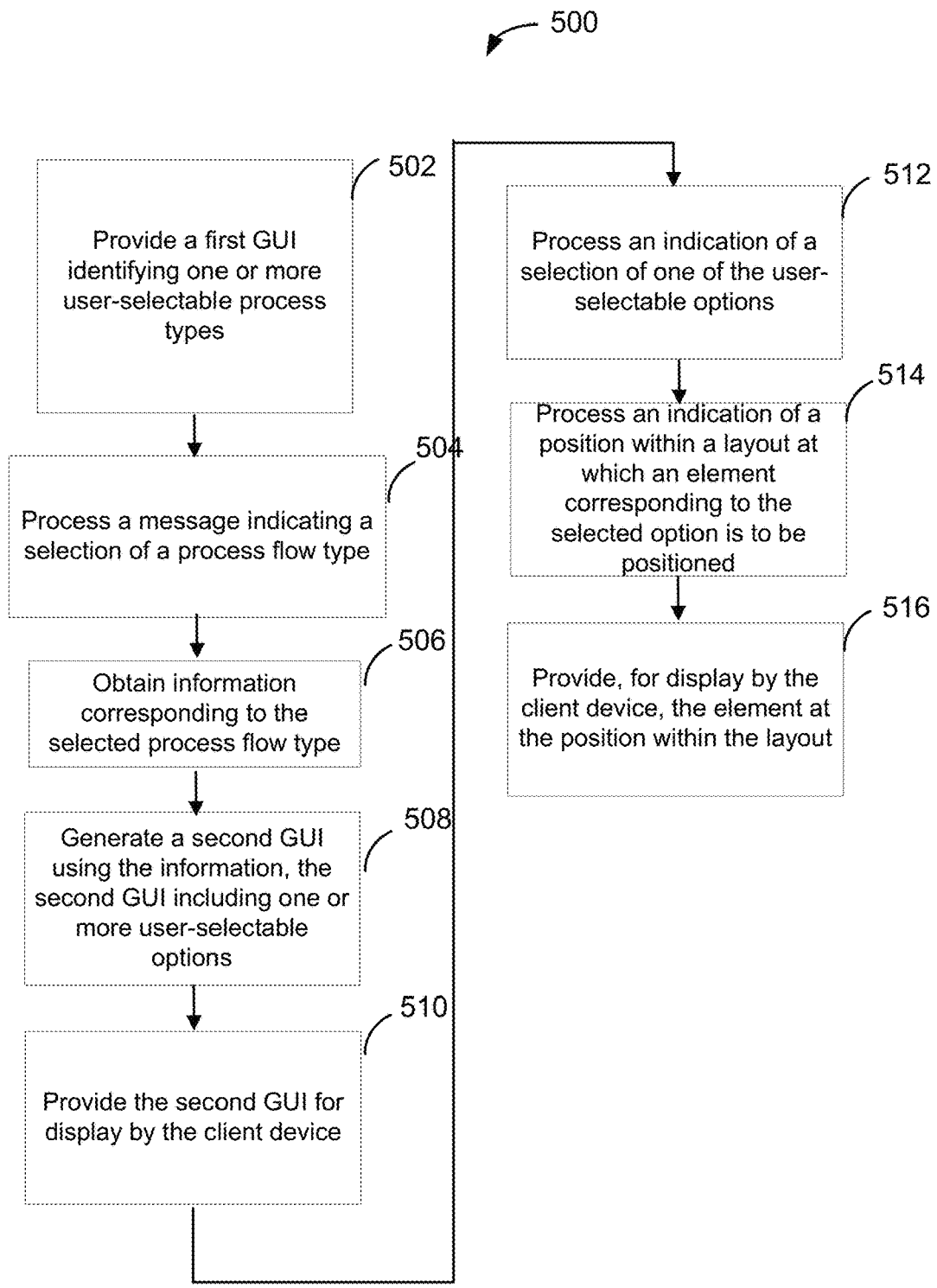
FIG. 5 shows a process flow diagram illustrating an example of a process for implementing a flow builder, in accordance with some implementations.

FIG. 5 shows a process flow diagram illustrating an example of a process for operating a flow builder, in accordance with some implementations. A user may log into their account via system 102. The user may then access an application configured to implement a flow builder. Through the flow builder, the user may generate a layout representing a process flow, as will be described in further detail below.

A flow builder of the system provides, for presentation by a client device, a first graphical user interface (GUI) identifying one or more user selectable process flow types at 502. Each process flow type may be associated with a corresponding group, team, or function within an organization. For example, a process flow type may be associated with Accounting, Customer Service, or Sales. In some implementations, a file may include a palette definition for a particular process flow type.

The system processes a message received from the client device at 504, where the message indicates a selection of a process flow type of the user selectable process flow types. Responsive to the message, the system obtains information corresponding to the selected process flow type at 506. For example, the system may receive a Hypertext Transfer Protocol (HTTP) request from the client device in response to selection of the process flow type, selection of a particular layout of the process flow type, or specification of a new layout of the process flow type. The system may transmit a query identifying the selected process flow type via an application programming interface (API).

In some implementations, a process flow type is defined by a corresponding class. An API of the class (or associated object) may be called to obtain information associated with the process flow type. For example, the flow builder may call an API to obtain a list of elements associated with the process flow type, a list of element subtypes associated with the process flow type, a list of action element types associated with the process flow type, and/or a "shape" of the palette (e.g., which identifies headers and/or items associated with each header). Through the use of such APIs, the system may obtain palette information or a portion thereof, which can be provided to the flow builder.

Similarly, the flow builder may call an API to obtain values corresponding to fields of elements (e.g., element types, element subtypes, and/or invocable actions) identified in the list of elements, the list of element subtypes, and/or the list of action element types. For example, an API may be called to obtain field values of element subtypes corresponding to the selected process flow type. In some implementations, for each of the element subtypes, values corresponding to fields of the corresponding subclass are obtained. Example fields include, but are not limited to, a name, a label identifies the element subtype in a palette, a description that will be rendered when a user hovers over the icon in the palette or layout, an icon that will be used to represent the element subtype in the palette or layout, a color that will be used to represent the icon in the palette or layout, and a type of the element subtype.

In some implementations, the system queries palette definitions to obtain palette information associated with a palette definition corresponding to the selected process flow type. In addition, item information may be queried to obtain information associated with each item (e.g., element) identified in the palette information. For example, an item may correspond to an element type, an invocable action type, or an element subtype. In some implementations, the system parses a palette definition to generate palette information, which can include a string or JSON formatted data such as that described above with reference to FIG. 4B. In addition, the system may parse an element definition to obtain element information such as that described above with reference to FIG. 4C. The information may be received or generated by the flow builder responsive to the query, as described herein. The information can include palette information and item information. The information that is obtained may include one or more headers. Each header may be associated with one or more items. In some implementations, the information received by the flow builder includes JSON formatted data.

In some implementations, the information identifies, for at least a first header of the headers, one or more action element types. Each action element type may correspond to a set of computer-readable instructions configurable to execute a corresponding action. For example, a particular action element type may be defined via a corresponding class. The class may include a method that is called via an API during execution of a process flow corresponding to a layout including an element of the particular action element type. In some implementations, parameter value(s) of one or more parameters of the method may be customized via item information associated with the action element type.

In some implementations, the information identifies, for at least a first header of the headers, one or more element subtypes. In addition, the information may identify, for each element subtype, a corresponding element type. An element type may be defined via a class using an object-oriented language, where the class includes at least one procedure (e.g., method). A method of the class may be called via a corresponding API during execution of a process flow that includes an element of the element type.

An element subtype may similarly be defined via a class. For example, the element subtype may be defined by a class corresponding to the parent element type. As another example, the element subtype may be defined by a subclass or child class of the parent class. By implementing the element subtype as a subclass, it is possible for the subclass and therefore the element subtype to inherit the fields, methods (e.g., procedures), and nested classes of the superclass (and corresponding element type). Moreover, it is possible to customize the element subtype through selective inheritance and/or overriding of one or more fields and/or methods of a parent class. In this manner, it is possible to provide a specific implementation of a method already provided by a parent class.

The information may further include item information, which can include a set of values corresponding to one or more fields associated with an element type, an element subtype, or an invocable action type (e.g., of a corresponding definition). Where the item information is associated with an element subtype, at least one of the values may override a value of a corresponding field or parameter associated with the element type.

In some implementations, the system validates a palette definition and/or element definition of element(s) identified in the palette definition prior to generation of the information (e.g., JSON formatted data). In other implementations, the system validates at least a portion of the information generated based upon the palette definition and/or element definition(s). More particularly, validation of the definition(s) and/or associated information may be performed by the flow builder or another system component. For example, validation may be performed in response to the selection by a user of a process flow type.

As described above, the system may validate that the information or definition(s) includes, for each field associated with an item, a corresponding value. In addition, the system may verify that, for at least one field associated with an item, that the corresponding value is of the correct data type. In addition, the system may perform de-duplication to ensure that two instances of the same field are not present in the user interface or definition(s). The system may also verify that all items/elements of the palette are identified, in the system, as layout elements capable of being added to a layout.

For example, an item may have one or more fields associated therewith, where the fields include a label, an icon, description, and/or a color. In this instance, the system may verify that the value of the color is a hexadecimal color value.

The system proceeds with generating a second GUI corresponding to the selected process flow type using the obtained information at 508. In some implementations, the second GUI includes the headers and, for at least one header, one or more user selectable options corresponding to one or more items. For example, at least one user-selectable option may correspond to an element subtype. As another example, at least one user-selectable option may correspond to a particular invocable action element type.

An element of a corresponding type (e.g., invocable action or element subtype) may be represented by a corresponding user interface component. For example, an element may be represented by an icon and/or color, as specified in the field values of the obtained information corresponding to the selected process flow type. A user interface component may correspond to a procedure (e.g., method) that includes a set of computer-readable instructions. For example, a square shaped icon that is orange in color may represent an assignment operation while a square shaped icon that is red in color may represent a Get Records operation. As another example, a diamond shaped icon may represent a decision operation. As yet another example, a Get Records operation represented by a corresponding icon may obtain information from record(s) of a database such as a CRM database.

The system provides the second GUI for display by the client device at 510. For example, the system may transmit a HTTP response including JSON formatted data to the client device. In addition, the system may present a "canvas" on which a layout may be generated or modified. The user may access a previously stored layout or may create a layout from a blank canvas. Each layout may correspond to a process flow identified by a corresponding flow name.

The system may process an indication of a selection of one of the user selectable options at 512, where the indication of the selection is received from the client device. For example, the selected option may correspond to an element of a particular element type, element subtype, or invocable action type.

The user may perform a drag-and-drop operation to position an element of the desired type within a layout. The system processes an indication of a position, within a layout representing a process flow, at which an element representing the selected type (e.g., element subtype or invocable action type) is to be positioned at 514. The system may then provide, for display by the client device, an element representing the element subtype at the position within the layout at 516.

The layout may be stored in a file for subsequent retrieval. In some implementations, the file may have associated permissions that indicate users having permission to access and/or modify the updated layout.

The layout may identify, for each element of the layout, a corresponding position within the layout. In addition, the layout may indicate, for one or more elements of the layout, a corresponding type. In some implementations, the layout may indicate that an element corresponds to an element subtype.

During execution of the process flow represented by the layout, the system may execute computer-readable instructions corresponding to the elements of the layout. For example, the system may call an API corresponding to an element. Where the element represents an instance of an element subtype, the API may correspond to a method of a class associated with the parent element type or a subclass of the class, as described herein. For example, the system may call the API with one or more parameter values associated with parameter(s) of a method of the class. An element subtype may benefit from inherited properties of the parent class while enabling default values of the parent class to be overridden (e.g., via one or more values that have been provided in an element definition or customized via the flow builder).

Where the element represents an instance of an invocable action type, the system may call an API corresponding to a method of a class associated with the invocable action type. In some implementations, the method obtains or otherwise processes records obtained from a CRM database. In other implementations, the method communicates with an application or service via a corresponding API. For example, the method may call the API of the application or service with value(s) of the item information associated with the invocable action type.

In some implementations, the process flow may be executed in an object-oriented system. For example, a class that defines a particular element subtype may be instantiated to generate an object of the element subtype. As another example, a class that defines a particular invocable action may be instantiated to generate an object of the invocable action type. Therefore, object-oriented techniques may be leveraged to facilitate the generation of a layout and execution of a process flow represented by the layout.

While the above-disclosed implementations are described with reference to action element types and element subtypes, these examples are merely illustrative. Therefore, the implementations may also be applied to other types of elements.

Some but not all of the techniques described or referenced herein are implemented using or in conjunction with a database system. Salesforce.com, inc, is a provider of customer relationship management (CRM) services and other database management services, which can be accessed and used in conjunction with the techniques disclosed herein in some implementations. In some but not all implementations, services can be provided in a cloud computing environment, for example, in the context of a multi-tenant database system. Thus, some of the disclosed techniques can be implemented without having to install software locally, that is, on computing devices of users interacting with services available through the cloud. Some of the disclosed techniques can be implemented via an application installed on computing devices of users.

Information stored in a database record can include various types of data including character-based data, audio data, image data, animated images, and/or video data. A database record can store one or more files, which can include text, presentations, documents, multimedia files, and the like. Data retrieved from a database can be presented via a computing device. For example, visual data can be displayed in a graphical user interface (GUI) on a display device such as the display of the computing device. In some but not all implementations, the disclosed methods, apparatus, systems, and computer program products may be configured or designed for use in a multi-tenant database environment.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 6A:
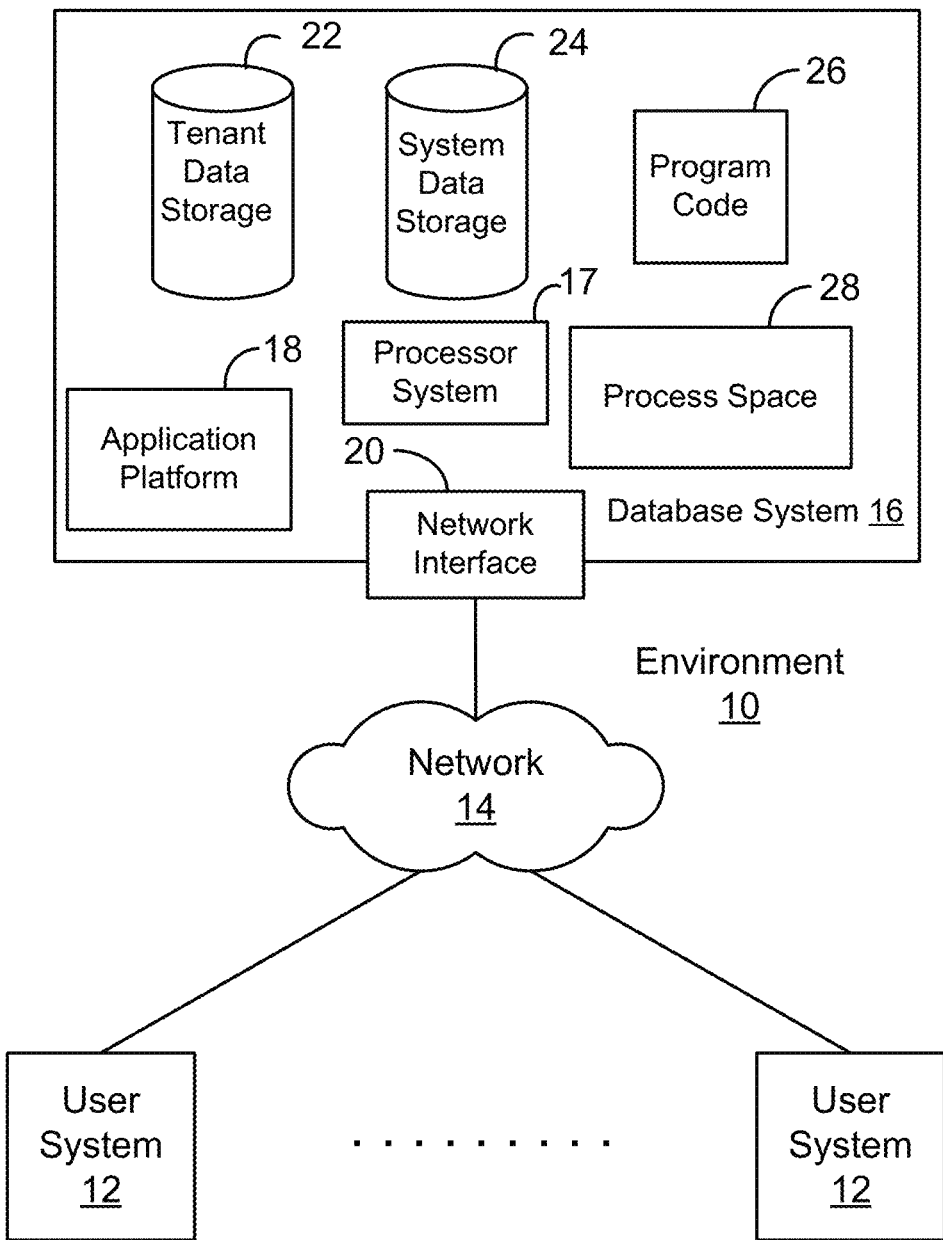
FIG. 6A shows a block diagram of an example of an environment 10 in which an on-demand database service can be used in accordance with some implementations.

FIG. 6A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 6A (and in more detail in FIG. 6B) user systems 12 might interact via a network 14 with an on-demand database service, which is implemented in the example of FIG. 6A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software. e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network). WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 6A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 7A:
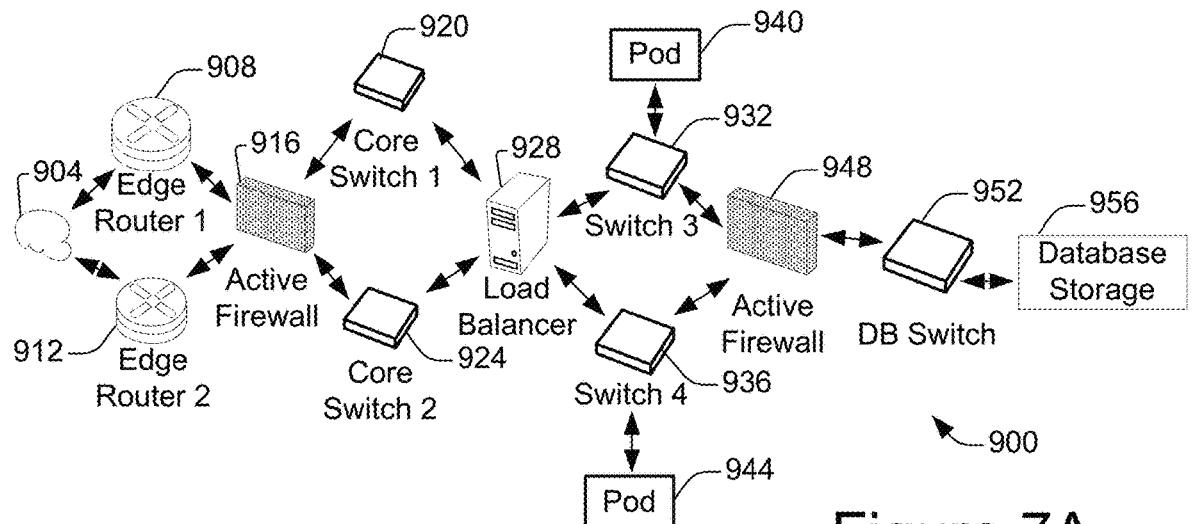
FIG. 7A shows a system diagram of an example of architectural components of an on-demand database service environment 900, in accordance with some implementations.
Figure 7B:
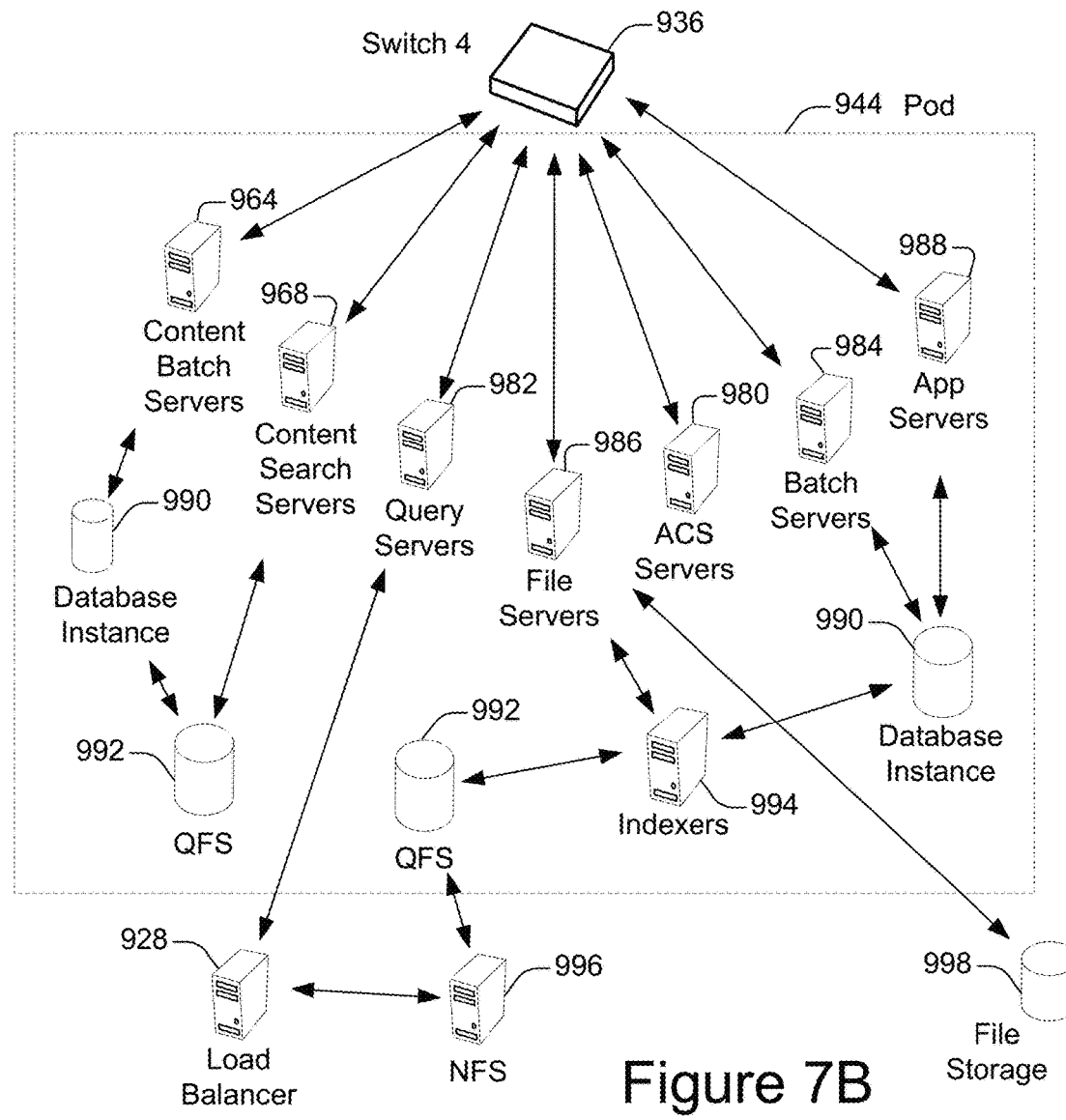
FIG. 7B shows a system diagram further illustrating an example of architectural components of an on-demand database service environment, in accordance with some implementations.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 6A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 6B:
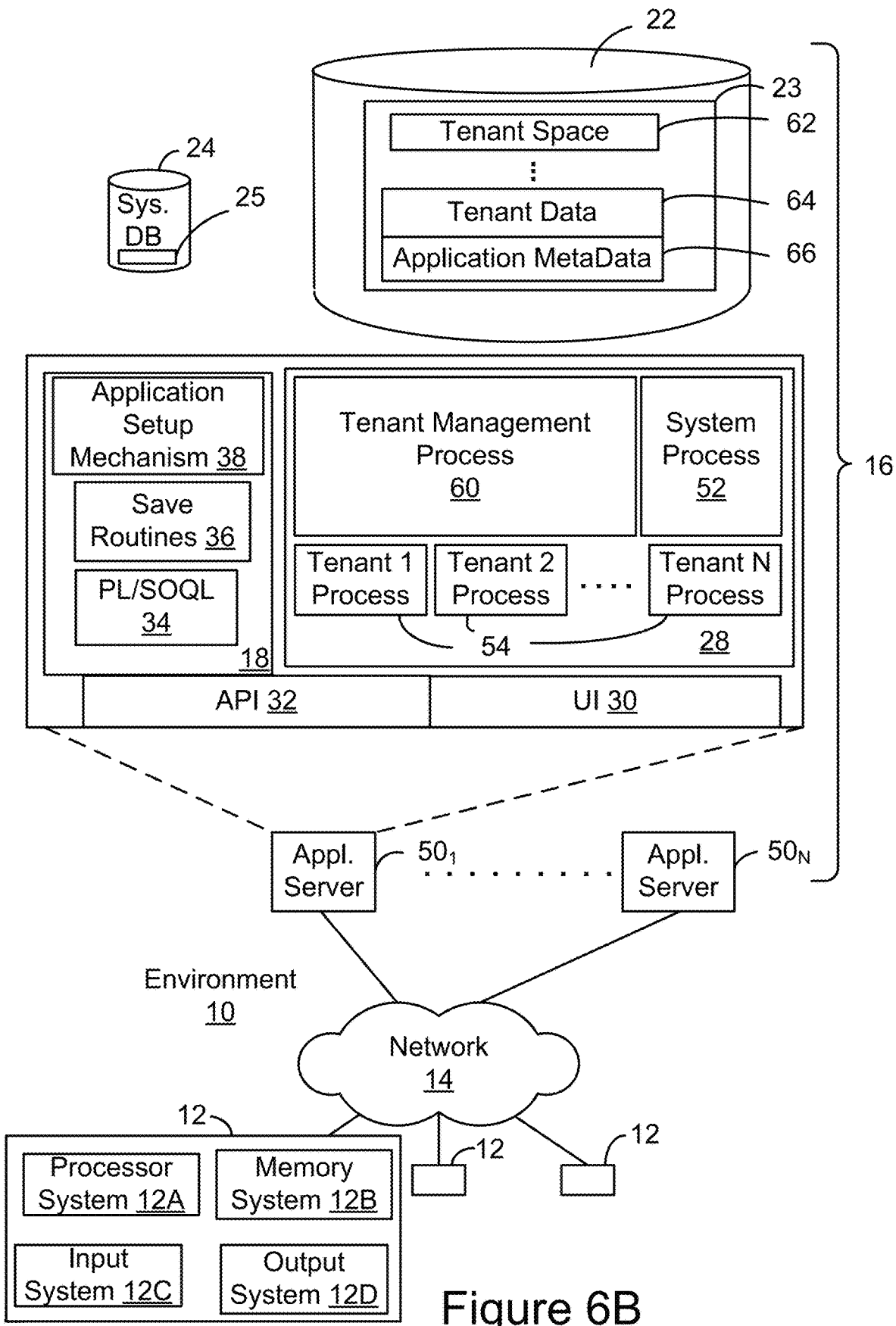
FIG. 6B shows a block diagram of an example of some implementations of elements of FIG. 6A and various possible interconnections between these elements.

FIG. 6B shows a block diagram of an example of some implementations of elements of FIG. 6A and various possible interconnections between these elements. That is, FIG. 6B also illustrates environment 10. However, in FIG. 6B elements of system 16 and various interconnections in some implementations are further illustrated. FIG. 6B shows that user system 12 may include processor system 12A, memory system 12B, input system 12C, and output system 12D. FIG. 6B shows network 14 and system 16. FIG. 6B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 6A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 6B, system 16 may include a network interface 20 (of FIG. 6A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MIS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 7A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 7A and 7B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 7A and 7B, some implementations of an on-demand database service environment may include anywhere from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 7B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 7A and 7B.

FIG. 7B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, California. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 7B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 7B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 6A, 6B, 7A and 7B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 6A, 6B, 7A and 7B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. A method, comprising:

providing, for presentation by a client device, a first graphical user interface (GUI) identifying one or more user selectable process flow types;

processing a message received from the client device, the message indicating a selection of a process flow type of the user selectable process flow types;

responsive to the message, obtaining information corresponding to the selected process flow type, the information including one or more headers, the information identifying, for at least a first header of the headers, one or more element subtypes, each element subtype being associated with a corresponding element type, the information including, for each of the element subtypes, a set of values corresponding to one or more fields associated with the element subtype, the element type being associated with a class, each of the element subtypes being a subclass of the class, at least one of the values corresponding to the fields associated with at least one of the element subtypes overriding a corresponding value associated with the element type;

for at least one of the element subtypes, validating the set of values corresponding to the fields associated with the element subtype;

for at least one of the element subtypes, verifying that the element subtype is identified as a process flow element that can be added to a layout representing a process flow;

generating a second GUI using the information, the second GUI including the headers and including, for the first header, one or more user selectable options corresponding to the one or more element subtypes;

providing the second GUI for display by the client device;

processing an indication of a selection of one of the user selectable options corresponding to an element subtype of the one or more element subtypes, the indication of the selection being received from the client device;

processing an indication of a position, within a layout representing a process flow, at which an element representing the element subtype is to be positioned; and providing, for display by the client device, an element representing the element subtype at the position within the layout, the element at the position within the layout corresponding to a set of computer-readable instructions.

2. The method as recited in claim 1, further comprising:
responsive to processing the message, transmitting a query identifying the selected process flow type via an application programming interface (API);
wherein the information is obtained responsive to the query.

3. The method as recited in claim 1, the information identifying, for each element subtype, the corresponding element type, the method further comprising:
executing the process flow, wherein executing the process flow includes calling an application programming interface (API) corresponding to the element type.

4. The method as recited in claim 1, wherein validating the set of values corresponding to the fields associated with the element subtype comprises:
verifying that the information includes, for each of the fields, a corresponding value.

5. The method as recited in claim 1, the fields associated with the element subtype including at least one of: an icon identifier, a color, a label, or a description, wherein validating the set of values corresponding to the fields associated with the element subtype comprises:
validating, for at least one of the fields, a type of a corresponding value.

6. A system comprising:
a database system implemented using a server system, the database system configurable to cause:
providing, for presentation by a client device, a first graphical user interface (GUI) identifying one or more user selectable process flow types;
processing a message received from the client device, the message indicating a selection of a process flow type of the user selectable process flow types;
responsive to the message, obtaining information corresponding to the selected process flow type, the information including one or more headers, the information identifying, for at least a first header of the headers, one or more element subtypes, each element subtype being associated with a corresponding element type, the information including, for each of the element subtypes, a set of values corresponding to one or more fields associated with the element subtype, the element type being associated with a class, each of the element subtypes being a subclass of the class, at least one of the values corresponding to the fields associated with at least one of the element subtypes overriding a corresponding value associated with the element type;
for at least one of the element subtypes, validating the set of values corresponding to the fields associated with the element subtype;
for at least one of the element subtypes, verifying that the element subtype is identified as a process flow element that can be added to a layout representing a process flow;
generating a second GUI using the information, the second GUI including the headers and including, for the first header, one or more user selectable options corresponding to the one or more element subtypes;
providing the second GUI for display by the client device;
processing an indication of a selection of one of the user selectable options corresponding to an element subtype of the one or more element subtypes, the indication of the selection being received from the client device;
processing an indication of a position, within a layout representing a process flow, at which an element representing the element subtype is to be positioned; and
providing, for display by the client device, an element representing the element subtype at the position within the layout, the element at the position within the layout corresponding to a set of computer-readable instructions.

7. The system as recited in claim 6, the database system further configurable to cause:
responsive to processing the message, transmitting a query identifying the selected process flow type via an application programming interface (API);
wherein the information is obtained responsive to the query.

8. The system as recited in claim 6, the information identifying, for each element subtype, the corresponding element type, the database further configurable to cause:
executing the process flow, wherein executing the process flow includes calling an application programming interface (API) corresponding to the element type.

9. The system as recited in claim 6, wherein validating the set of values corresponding to the fields associated with the element subtype comprises:
verifying that the information includes, for each of the fields, a corresponding value.

10. The system as recited in claim 6, the fields associated with the element subtype including at least one of: an icon identifier, a color, a label, or a description, wherein validating the set of values corresponding to the fields associated with the element subtype comprises:
validating, for at least one of the fields, a type of a corresponding value.

11. A non-transitory computer readable medium storing thereon computer-readable program code capable of being executed by one or more processors, the program code comprising computer-readable instructions configurable to cause:
providing, for presentation by a client device, a first graphical user interface (GUI) identifying one or more user selectable process flow types;
processing a message received from the client device, the message indicating a selection of a process flow type of the user selectable process flow types;
responsive to the message, obtaining information corresponding to the selected process flow type, the information including one or more headers, the information identifying, for at least a first header of the headers, one or more element subtypes, each element subtype being associated with a corresponding element type, the information including, for each of the element subtypes, a set of values corresponding to one or more fields associated with the element subtype, the element type being associated with a class, each of the element subtypes being a subclass of the class, at least one of the values corresponding to the fields associated with at least one of the element subtypes overriding a corresponding value associated with the element type;
for at least one of the element subtypes, validating the set of values corresponding to the fields associated with the element subtype;
for at least one of the element subtypes, verifying that the element subtype is identified as a process flow element that can be added to a layout representing a process flow;
generating a second GUI using the information, the second GUI including the headers and including, for the first header, one or more user selectable options corresponding to the one or more element subtypes;

providing the second GUI for display by the client device;

processing an indication of a selection of one of the user selectable options corresponding to an element subtype of the one or more element subtypes, the indication of the selection being received from the client device;

processing an indication of a position, within a layout representing a process flow, at which an element representing the element subtype is to be positioned; and providing, for display by the client device, an element representing the element subtype at the position within the layout, the element at the position within the layout corresponding to a set of computer-readable instructions.

12. The non-transitory computer readable medium as recited in claim 11, the program code comprising computer-readable instructions configurable to cause:

responsive to processing the message, transmitting a query identifying the selected process flow type via an application programming interface (API);

wherein the information is obtained responsive to the query.

13. The non-transitory computer readable medium computer program product as recited in claim 11, the information identifying, for each element subtype, the corresponding element type, the program code comprising computer-readable instructions configurable to cause:

executing the process flow, wherein executing the process flow includes calling an application programming interface (API) corresponding to the element type.

14. The non-transitory computer readable medium as recited in claim 11, wherein validating the set of values corresponding to the fields associated with the element subtype comprises:

verifying that the information includes, for each of the fields, a corresponding value.

15. The non-transitory computer readable medium as recited in claim 11, the fields associated with the element subtype including at least one of: an icon identifier, a color, a label, or a description, wherein validating the set of values corresponding to the fields associated with the element subtype comprises:

validating, for at least one of the fields, a type of a corresponding value.

* * * * *